(12) United States Patent
Hanson et al.

(10) Patent No.: US 10,320,259 B2
(45) Date of Patent: Jun. 11, 2019

(54) PULL TIGHT MOTOR HOUSING

(71) Applicant: Bison Gear & Engineering Corp., St. Charles, IL (US)

(72) Inventors: Matthew Sherman Hanson, Palatine, IL (US); George Thomas, Lombard, IL (US); Gary Dorough, Litchfield Park, AZ (US); Jeff Hamaker, McHenry, IL (US); Edmund Peter Henke, Jr., Lake Geneva, WI (US); Sanel Tatar, Schaumburg, IL (US)

(73) Assignee: Bison Gear & Engineering Corp., St. Charles, IL (US)

( * ) Notice: Subject to any disclaimer, the term of this patent is extended or adjusted under 35 U.S.C. 154(b) by 152 days.

(21) Appl. No.: 15/675,245

(22) Filed: Aug. 11, 2017

(65) Prior Publication Data

US 2017/0338712 A1    Nov. 23, 2017

Related U.S. Application Data

(62) Division of application No. 14/224,023, filed on Mar. 24, 2014, now Pat. No. 10,170,955.

(60) Provisional application No. 61/805,064, filed on Mar. 25, 2013.

(51) Int. Cl.
| | |
|---|---|
| *H02K 1/04* | (2006.01) |
| *H02K 5/04* | (2006.01) |
| *H02K 7/116* | (2006.01) |
| *H02K 5/10* | (2006.01) |
| *H02K 5/02* | (2006.01) |

(52) U.S. Cl.
CPC .............. *H02K 5/04* (2013.01); *H02K 5/02* (2013.01); *H02K 5/10* (2013.01); *H02K 7/116* (2013.01)

(58) Field of Classification Search
CPC .. H02K 5/00; H02K 5/02; H02K 5/04; H02K 5/10; H02K 1/18; H02K 7/116
USPC .......................... 310/89–91, 43; 29/596, 598
See application file for complete search history.

(56) References Cited

U.S. PATENT DOCUMENTS

| | | | | |
|---|---|---|---|---|
| 4,598,218 A * | 7/1986 | Aleem | ...................... | H02K 1/24 29/426.4 |
| 6,300,562 B1 * | 10/2001 | Daoud | ................. | G02B 6/4444 174/50 |
| 7,254,880 B2 * | 8/2007 | Aab | ....................... | H02K 5/225 29/596 |
| 9,895,814 B2 * | 2/2018 | Krumbacher | ............ | B25J 9/102 |

(Continued)

*Primary Examiner* — Thanh Lam
(74) *Attorney, Agent, or Firm* — Garlick & Markison; Timothy W. Markison

(57) ABSTRACT

A method of manufacturing a motor, which begins with robotically positioning a flexible insulating sleeve over a first motor sub-assembly to produce a second motor sub-assembly. The first motor sub-assembly includes a motor assembly and an end-cap. The motor assembly includes a stator, a rotor, and wiring connected to the stator. The end-cap includes an electrical fitting for feeding the wiring externally of the motor. The method continues with robotically positioning a flexible enclosure, that includes a formed housing section and a connecting section, loosely over the second motor sub-assembly. The method continues with tightening the connecting section until the formed housing section tightly fits over the second sub-assembly compressing the flexible insulating sleeve to produce an insulating seal.

8 Claims, 11 Drawing Sheets

(56) References Cited

U.S. PATENT DOCUMENTS

2013/0220073 A1* 8/2013 Suto .................. F16H 1/16
  74/606 R

* cited by examiner

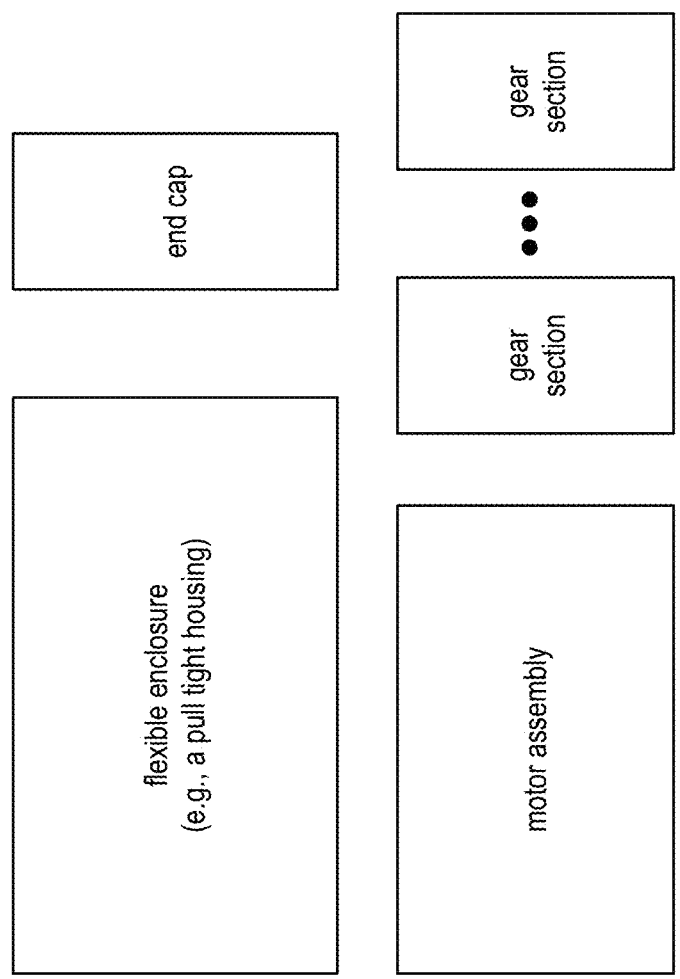

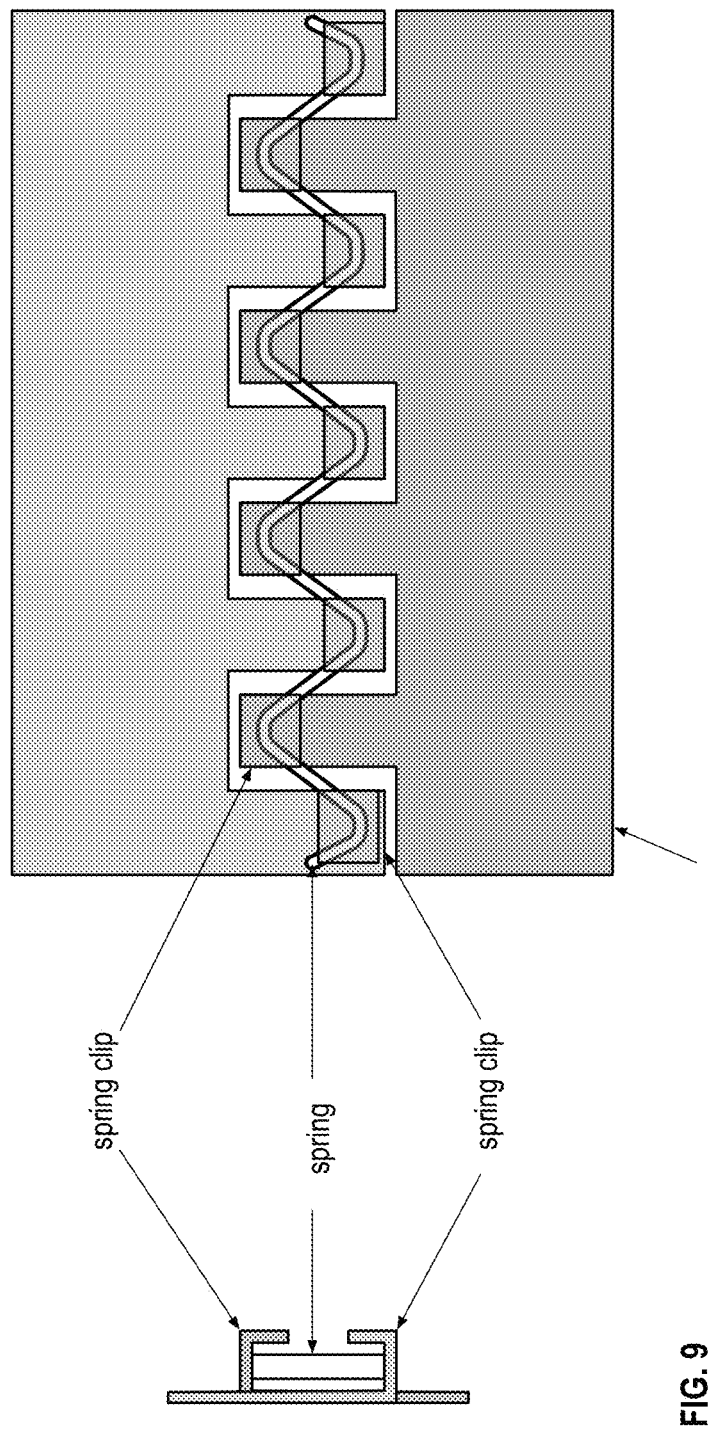

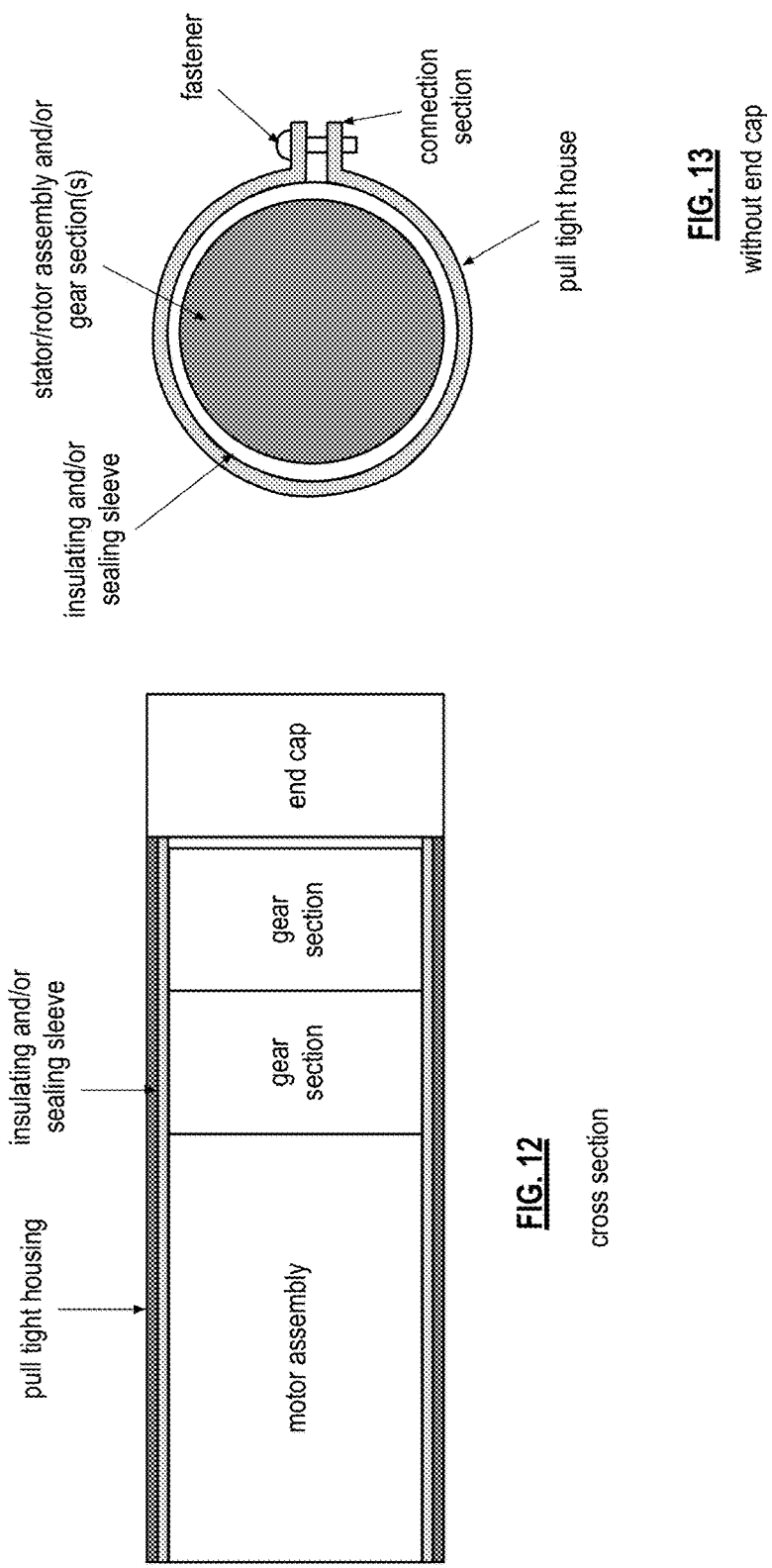

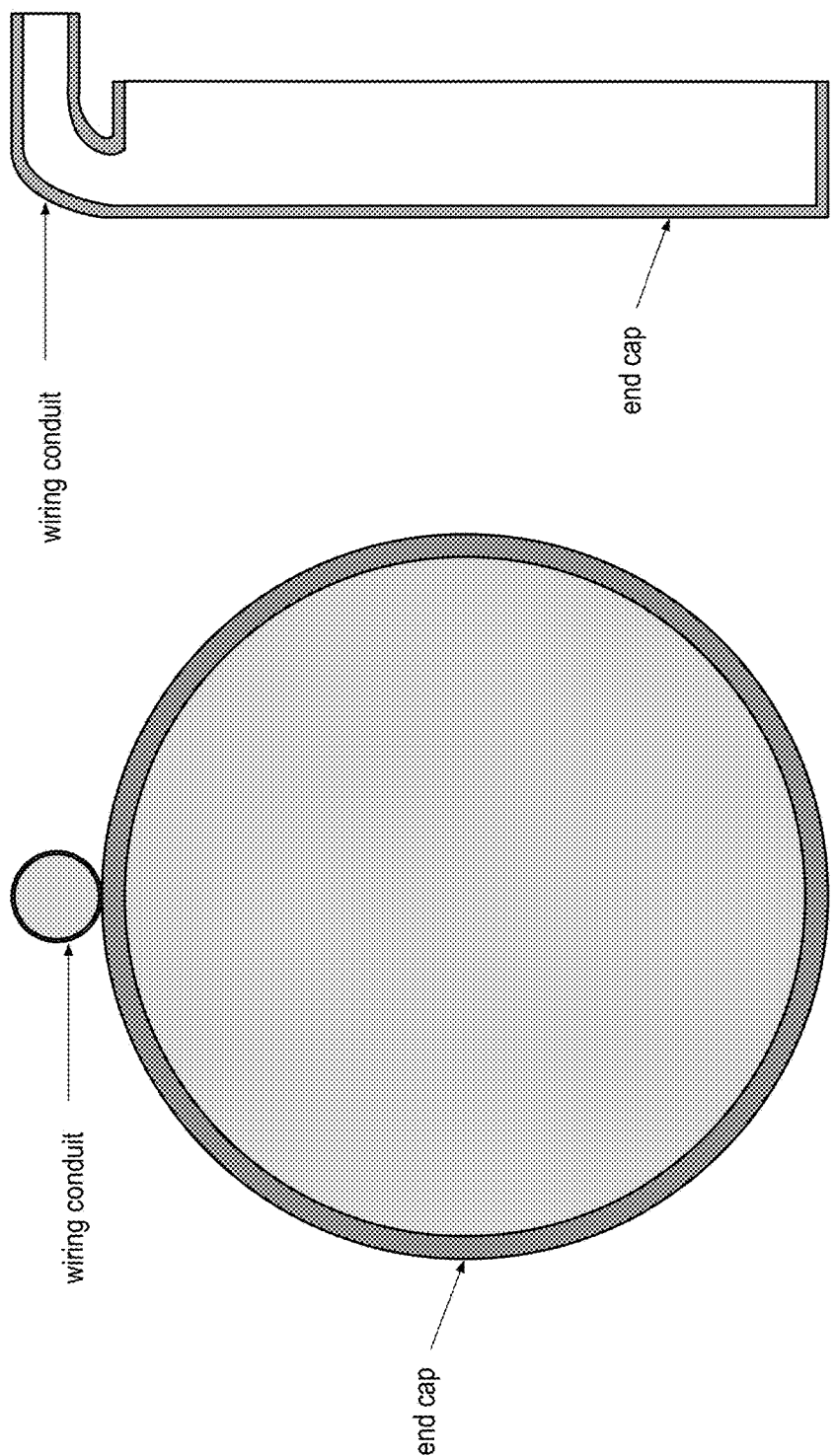

PULL TIGHT MOTOR HOUSING

CROSS REFERENCE TO RELATED PATENTS

The present U.S. Utility Patent Application claims priority under 35 USC § 121 as a divisional of U.S. Utility application Ser. No. 14/224,023 entitled, "PULL TIGHT MOTOR HOUSING" filed Mar. 24, 2014, which claims priority pursuant to 35 U.S.C. § 119(e) to U.S. Provisional Application No. 61/805,064, entitled "PULL TIGHT MOTOR HOUSING", filed Mar. 25, 2013, both of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to motors, generators, alternators, and the like and more particularly to housing such electronic components.

Description of Related Art

In general, AC induction and brushless DC (BLDC) motors are enclosed using a steel shell or aluminum extrusion. The enclosures or "shells" are manufactured to inner dimension tolerances that are very stringent (e.g., +/−0.001" diameter). When the shell is made of steel, a second manufacturing operation is needed to prevent rust.

During assembly of a motor, the components of the motor (e.g., stator, rotor, gear boxes, etc.) are secured into the shell using tie bolts, which requires that the shell include internal or external tapped holes or steel nuts. In addition to adding to the cost of the motor and requiring multiple manufacturing operations, the use of steel tie bolts contribute to stator losses.

When an application requires that a motor be submersed, or exposed to, water, then the gears of the motor need to be protected to prevent damage from the water. One approach to protect the gears is to use a urethane as a sealant, which adds to the cost of the motor and adds additional manufacturing operations.

BRIEF DESCRIPTION OF THE SEVERAL VIEWS OF THE DRAWING(S)

FIG. 1 is a diagram of an embodiment of motor components in accordance with the present invention;

FIG. 9 is a diagram of another embodiment of securing a pull tight housing of a motor in accordance with the present invention;

FIG. 10 is a diagram of another embodiment of securing a pull tight housing of a motor in accordance with the present invention;

FIG. 12 is a diagram of an embodiment of a sealed gearbox of a motor in accordance with the present invention;

FIG. 13 is a diagram of another embodiment of a sealed gearbox of a motor in accordance with the present invention;

FIG. 14 is a diagram of an embodiment of a wiring conduit of a sealed gearbox of a motor in accordance with the present invention; and FIG. 15 is a diagram of another embodiment of a wiring conduit of a sealed gearbox of a motor in accordance with the present invention.

DETAILED DESCRIPTION OF THE INVENTION

Figure 3:
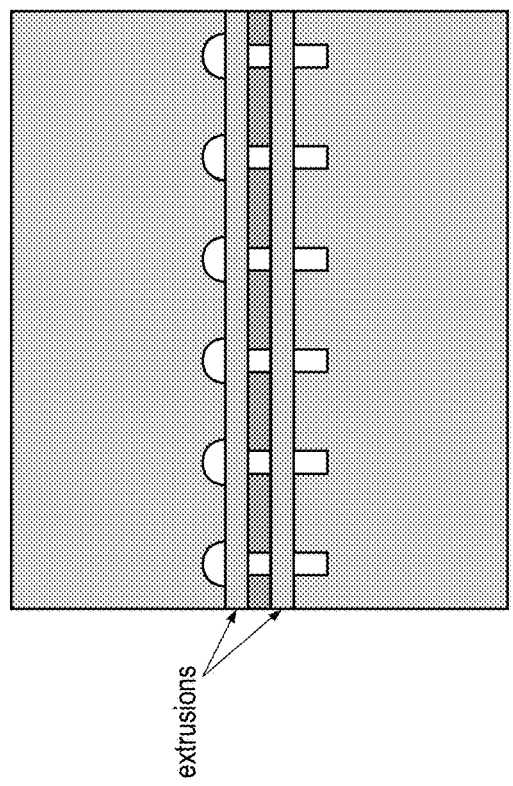
FIG. 3 is a diagram of another embodiment of securing a pull tight housing of a motor in accordance with the present invention.

FIG. 1 is a diagram of an embodiment of a motor that includes a flexible enclosure or pull tight housing, an end cap, a motor assembly, and one or more gear sections (e.g., gear train meshes within gear case enclosures, gearbox, planetary gears, gear case, etc.). The motor assembly includes a stator, a rotor, and wiring connected to the stator. The end-cap is coupled to the motor assembly to produce first sub-assembly. In addition, the end-cap includes an electrical fitting for feeding the wiring externally of the motor. The flexible insulating sleeve fits over at a least a portion the first sub-assembly to produce a second sub-assembly. The flexible enclosure includes a formed housing section and a connecting section. The formed housing section loosely fits over the second sub-assembly prior to tightening of the connecting section and, when the connecting section is tightened, the formed housing section tightly fits over the second sub-assembly compressing the flexible insulating sleeve to produce an insulating seal.

In an embodiment, the motor assembly includes a gear assembly and a middle bearing plate between the gear assembly and an assembly of the stator and the rotor. The middle bearing plate may be made of aluminum, plastic, or other material sufficiently strong enough to support the bearing loads of the motor and gear assembly.

The motor may be an AC motor, an AC alternator, a brushless DC motor, a brush commutated DC generator, etc. and used in a variety of applications. In particular, the motor may be used for pool cover designs, irrigation systems, food equipment, etc. When the motor is used for pool cover designs, it eliminates the need for urethane, which eliminates batch style manufacturing. Further, the motor eliminates tight tolerance machining on sealing surfaces and enables the user of low cost gasket style sealing.

For irrigation designs, the motor is capable of accommodating large outdoor temperature swings and compensate for the different temperature-based expansion and contraction of the different materials (e.g., aluminum, steel, polymers, etc.) of the motor. In addition, a flexible sleeve keeps moisture out of the motor and for adversely affecting the motor assembly.

The pull tight housing may be comprised of stainless steel, steel, aluminum, polymers, plastic, fiberglass, etc. and includes a formed housing section and a connecting section. The formed housing section has an inner form corresponding to an outer form of the motor components it will house (e.g., the stator/rotor assembly, a gear section, etc.). The formed housing section is pliable to easily fit over the motor components and, once in place, compresses, by applying a tangential force, around the motor components as the connecting section is utilized (e.g., hardware clamping the connecting section together). In an embodiment, the stator nest and motor end-shield will hold the input seal, the rotor bearing and will support the stator. This will be injection molded out of Rynite. Rynite is an approved material in our insulation system for use with core tubes, coil bobbins or other mechanical support components.

In an embodiment, the pull tight housing (or shell) is fabricated from flat stock steel (e.g., stainless or otherwise), aluminum, etc., to include the connecting section and then rolled into a desired shape. The initial inner diameter of the shell is larger (e.g., by at least 0.1 inches) than the diameter of the motor components for ease of robotic assembly. When the shell is positioned with respect to the motor components, the connecting section is tightened, which holds the motor together. The tightening of the connecting section is tangential to the circumference of the motor and may be done using screws, bolts, clamps, screws & extruded threads, self-tapping screws, welding, and/or spring clamping techniques (as discussed below).

A pull tight housing offers advantages for a variety of motor applications. For example, in a gear motor configuration, a rear end shield of the motor can be injection molded in plastic, thus eliminating the need for machining; the same for a middle bearing plate; no ties bolts are needed, which can improve the efficiency by three percent or more. As another example, when the motor includes a planetary gear motor construction, a plastic end shield and a plastic adapter may be used instead of a die cast aluminum versions thereof and the pull tight housing may be used in place of a die cast aluminum housing.

The pull tight housing improves quality and reduces manufacturing costs by allowing more powered metal components to be used, by increasing the use of injection molding in place of machined parts, and reduces machining variabilities. Further, the pull tight housing eliminates the need for tie bolts, improves structural strength, eliminates the need for painting or plating, and/or enables robotic assembly. Still further, the pull tight housing allows for an insulating sleeve to be used to seal the motor and/or gear case without using an encasing such as urethane, etc. The sleeve may be constructed from a heat conductive silicon to bar moisture from affecting the motor components. In addition, with the pull tight housing, repairing a motor is much more practical than when the motor is encased in a urethane since there is not urethane, or other material, encasing the components of the motor.

Figure 2:
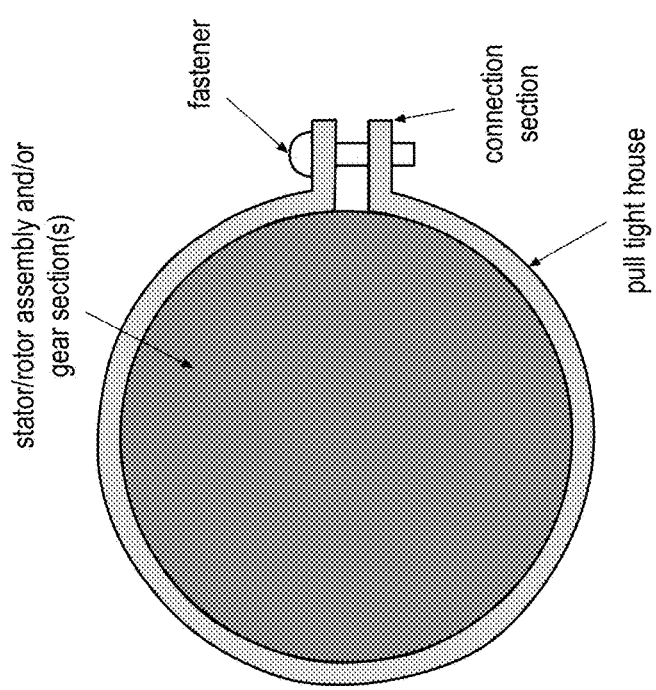
FIG. 2 is a diagram of an embodiment of securing a pull tight housing of a motor in accordance with the present invention.

FIG. 2 is a diagram of an example of securing a pull tight housing of a motor. In this example, the connection section is pulled together using a screw (e.g., self tapping or otherwise). As the screw is tightened, the formed housing section tightens around the components of the motor.

FIG. 3 is a diagram of another example of securing a pull tight housing of a motor. In this example, the pull tight housing is made of aluminum, where the connecting section includes extrusions. The connecting section may include threaded slots and/or slots for self-tapping fasteners.

Figure 4B:
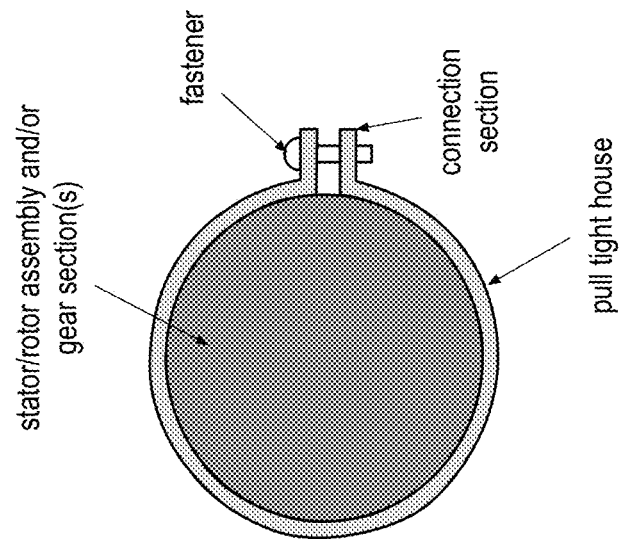
FIGS. 4A and 4B are diagrams of an embodiment of multiple pull tight housings for different sized motors in accordance with the present invention.
Figure 4A:
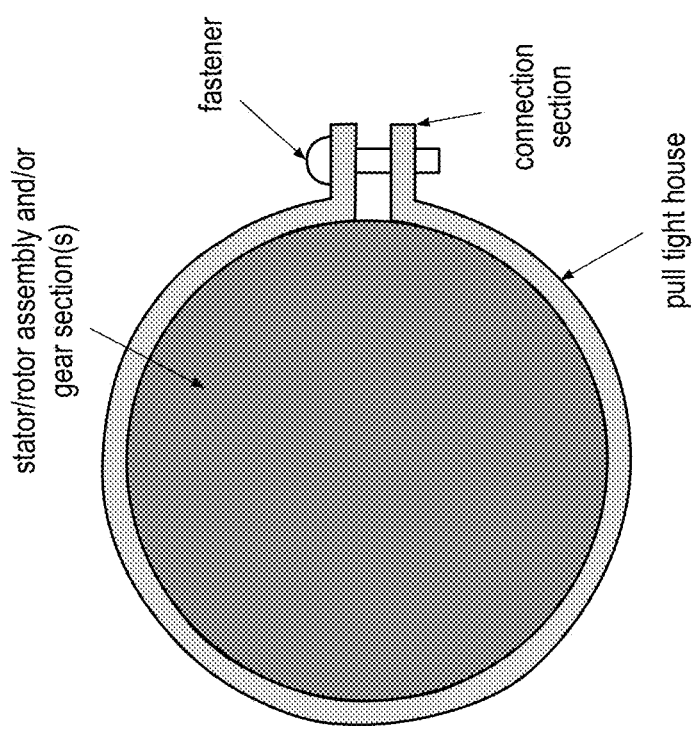

FIGS. 4A and 4B are diagrams of an embodiment of multiple pull tight housings for different sized motors and/or gear sections.

Figure 5:
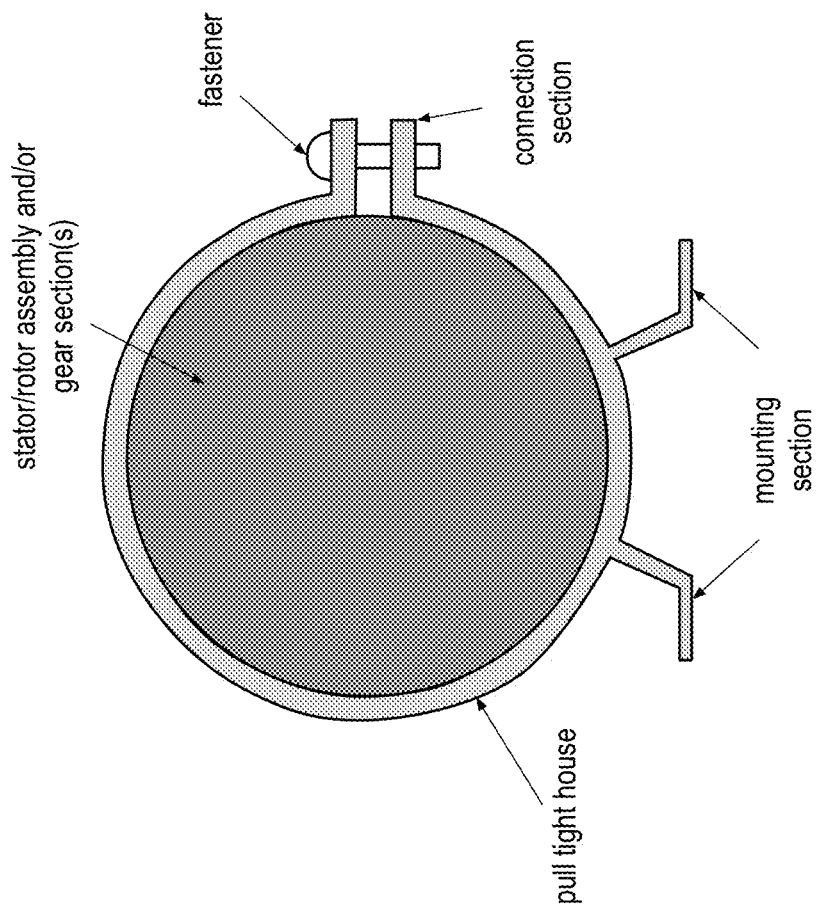
FIG. 5 is a diagram of an embodiment of a mounting section of a pull tight housing of a motor in accordance with the present invention.

FIG. 5 is a diagram of an embodiment of a mounting section of a pull tight housing of a motor. In this embodiment, the pull tight housing includes a mounting section for securing the motor within a product (e.g., pool cover, food equipment, irrigation equipment, etc.). The mounting section may be a separate piece that is attached to the pull tight housing (e.g., welded, etc.) or fabricated as part of the pull tight housing.

Figure 6:
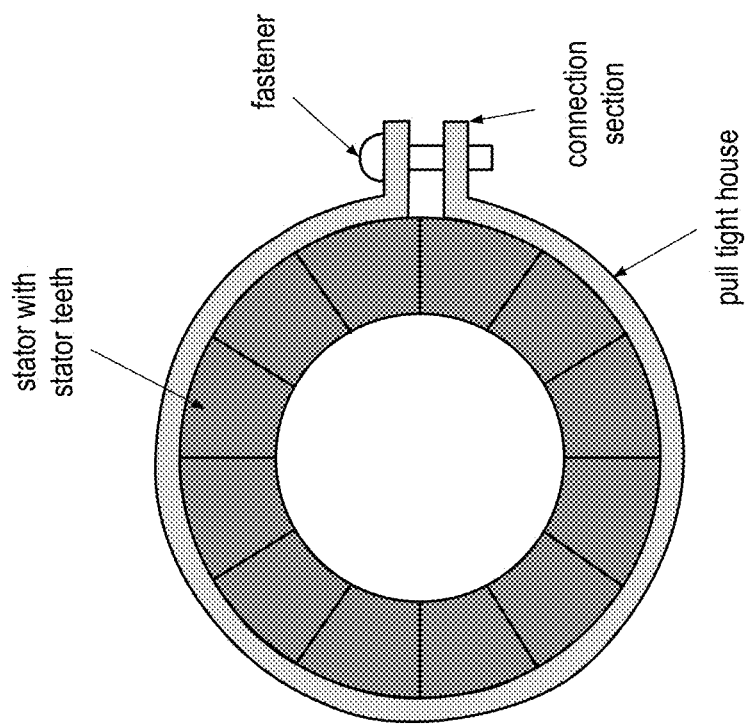
FIG. 6 is a diagram of another embodiment of securing a pull tight housing around components of a motor in accordance with the present invention.

FIG. 6 is a diagram of another example of securing a pull tight housing around components of a motor. The components include a plurality of stator teeth, where a stator tooth includes one or more coils, a winding bobbin, and a magnetic core. The magnetic core may be fabricated from a powdered metal (e.g., iron).

Figure 7:
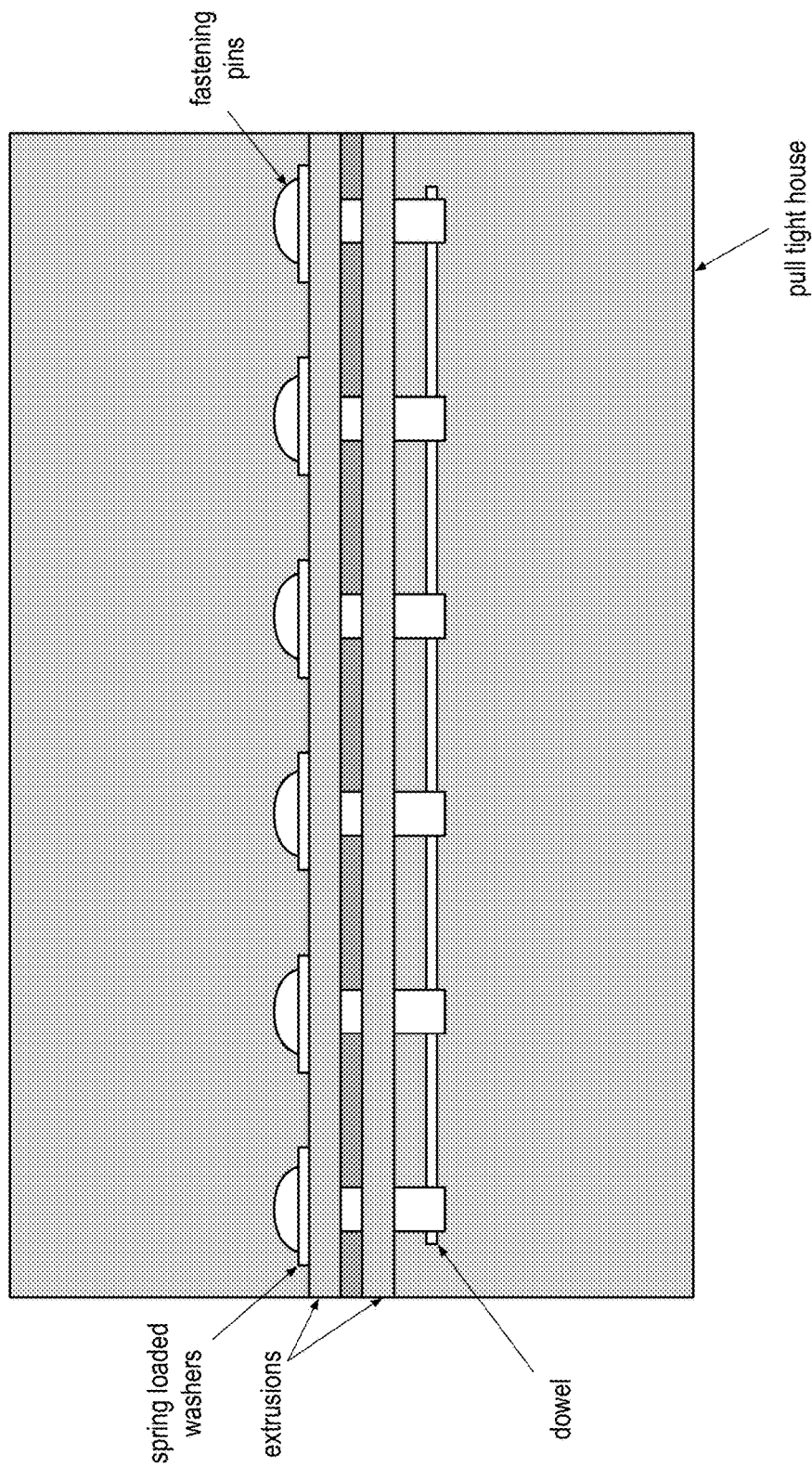
FIG. 7 is a diagram of another embodiment of securing a pull tight housing of a motor in accordance with the present invention.
Figure 8:
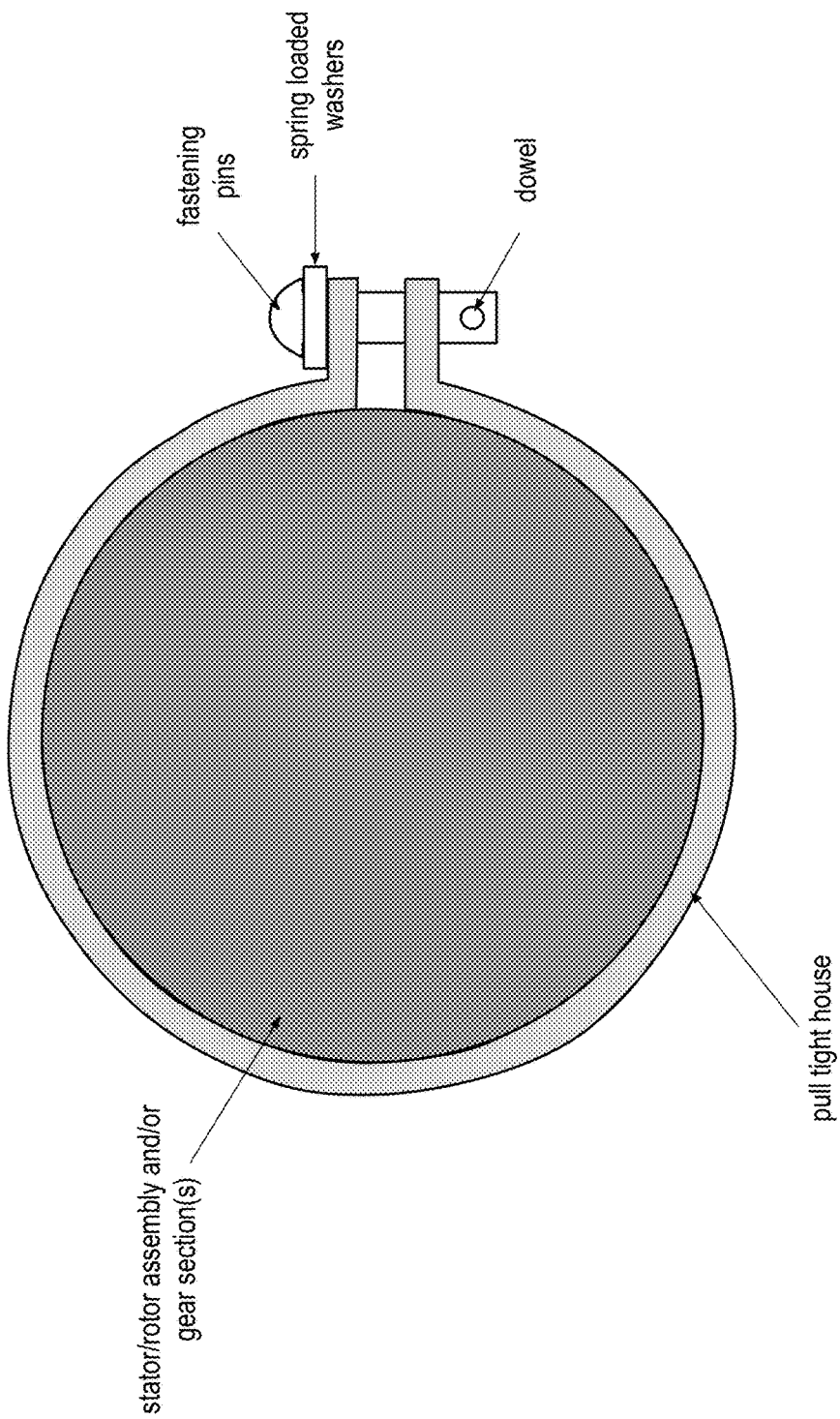
FIG. 8 is a diagram of another embodiment of securing a pull tight housing of a motor in accordance with the present invention.

FIGS. 7 and 8 are diagrams of another example of securing a pull tight housing of a motor. The securing components include a locking dowel, spring loaded washers, and fastening pins.

FIG. 9 is a diagram of another example of securing a pull tight housing of a motor using spring clips. In this diagram, the housing includes spring receptacles for receive a spring device.

FIG. 10 is a diagram of another example of securing a pull tight housing of a motor using spring clips. In this diagram, the spring device is inserted into the spring receptacles of the pulling tight housing. As the spring expands, it pushes outward on the receptacles, which tightens the housing around the motor components.

Figure 11:
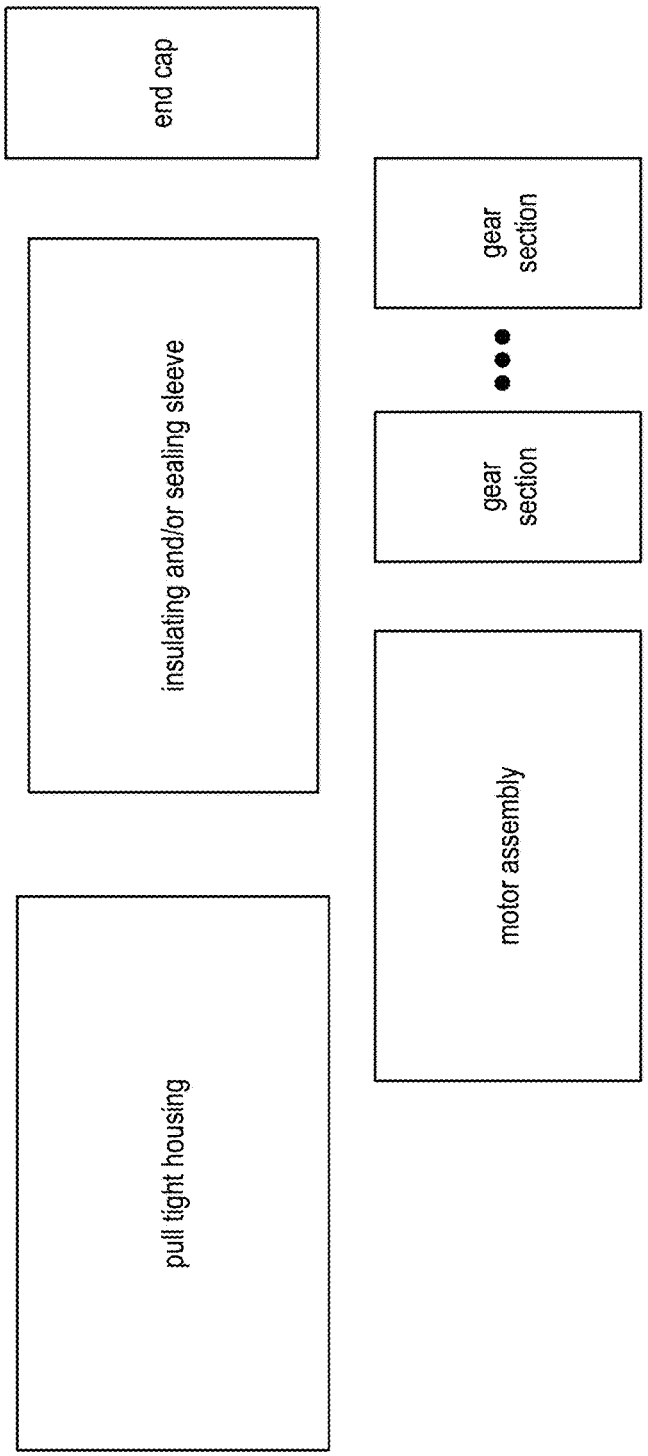
FIG. 11 is a diagram of an embodiment of components for sealing a gearbox of a motor in accordance with the present invention.

FIG. 11 is a diagram of an example of a motor that includes a gear motor (e.g., the stator/rotor assembly and the gear section), a pull tight housing, an insulating and/or sealing sleeve, and an end cap. The sleeve may be made of a heat conductive silicon, silicone, EPDM, rubber, Nitrile, heat shrinkable polyolefin or other type polymer sleeve that substantially bars moisture from adversely affecting the motor assembly.

FIG. 12 is a diagram of an example of the gear motor coupled to the end cap.

FIG. 13 is a diagram of an example of the sleeve fitting over a portion of the gear motor and end cap assembly.

FIG. 14 is a diagram of an embodiment of the end cap having wiring conduit, which may be flexible.

FIG. 15 is a diagram of an example of a sealed end of the motor of FIG. 14.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method of manufacturing a motor, the method comprises:
   robotically positioning a flexible insulating sleeve over a first motor sub-assembly to produce a second motor sub-assembly, wherein the first motor sub-assembly includes a motor assembly and an end-cap, wherein the motor assembly includes a stator, a rotor, and wiring connected to the stator, and wherein the end-cap includes an electrical fitting for feeding the wiring externally of the motor;
   robotically positioning a flexible enclosure loosely over the second motor sub-assembly, wherein the flexible enclosure includes a formed housing section and a connecting section; and
   tightening the connecting section until the formed housing section tightly fits over the second sub-assembly compressing the flexible insulating sleeve to produce an insulating seal.

2. The method of claim 1 further comprises:
   fabricating the flexible enclosure from flat stock material by:
   cutting the flat stock material to a desired flat shape;
   creating the connecting section at opposite ends of the desired flat shape; and
   rolling the desired flat shape with the connecting section to produce the formed housing section, wherein an inner diameter of the formed housing section is larger than an outer diameter of the second motor sub-assembly to enable the loose fitting.

3. The method of claim 1 further comprises:
   assembling the first motor sub-assembly by:
   positioning the stator and rotor between two stator rings to produce a stator-rotor assembly; and
   coupling the end-cap to the stator-rotor assembly.

4. The method of claim 1 further comprises:
   the first motor sub-assembly further including a gear case, wherein assembling the first motor sub-assembly includes:
   positioning a gear case cover in an assembly nest;
   positioning a low speed assembly of the gear case in the gear case cover;
   coupling a planetary assembly of the gear case to the low speed assembly to produce the gear case;
   positioning a stator next proximal to the gear case;
   positioning the stator and rotor in a stator nest to produce a stator-rotor assembly; and
   coupling the end-cap to the stator-rotor assembly.

5. The method of claim 1, wherein the tightening comprises:
   tightened one or more of screws, bolts with nuts, clamps, screws and extruded threads, and self-tapping screws.

6. The method of claim 1, wherein the tightening comprises:
   installing a locking dowel, spring loaded washers, and fastening pins.

7. The method of claim 1, wherein the tightening comprises:
   inserting one or more spring clips that are compressed into one or more spring clip receptacles of the connecting section; and
   at least partially decompressing the one or more spring clips to apply a force on the one or more spring clip receptacles to tighten the connecting section.

8. The method of claim 1 further comprises:
   fabricating the flexible insulating sleeve from a heat conductive material that substantially bars moisture from adversely affecting the motor assembly.

* * * * *